United States Patent [19]

Belshaw et al.

[11] 3,945,785
[45] Mar. 23, 1976

[54] APPARATUS FOR FILLING EDIBLE PRODUCTS

[75] Inventors: Thomas E. Belshaw; Fred G. Woodworth, both of Seattle; Wilbur D. Wilke, Camano Island, all of Wash.

[73] Assignee: Belshaw Brothers, Inc., Seattle, Wash.

[22] Filed: Apr. 22, 1974

[21] Appl. No.: 463,155

[52] U.S. Cl. ............. 425/132; 425/133.1; 425/287
[51] Int. Cl.² .................... A21C 9/06; A21C 11/18
[58] Field of Search............ 425/133.1, 132, 131.1, 425/287, 288

[56] References Cited
UNITED STATES PATENTS

| | | | |
|---|---|---|---|
| 2,643,621 | 6/1953 | Belshaw | 425/287 |
| 3,452,687 | 7/1969 | Kaneko et al | 425/298 X |
| 3,653,336 | 4/1972 | Kaneko et al | 425/132 |
| 3,807,919 | 4/1974 | Kaufman, Jr. et al | 425/133.1 |

*Primary Examiner*—Francis S. Husar
*Assistant Examiner*—David S. Safran
*Attorney, Agent, or Firm*—Seed, Berry, Vernon & Baynham

[57] ABSTRACT

Methods and an apparatus for filling doughnuts or like edible products with a filling in which the product is extruded over and through a hollow, annular filling nozzle such that the product material flows closely past radially, outwardly directed discharge openings in the filling nozzle. The product material forms a solid annular ring where it is rejoined, and filling material is injected into the ring by applying positive pressure to the filling material in the filling nozzle. The filling flow is stopped by applying negative pressure from within the filling nozzle to draw the filling material back from the discharge openings of the nozzle. The negative pressure allows the product material to move toward the discharge openings, sealing the openings.

21 Claims, 9 Drawing Figures

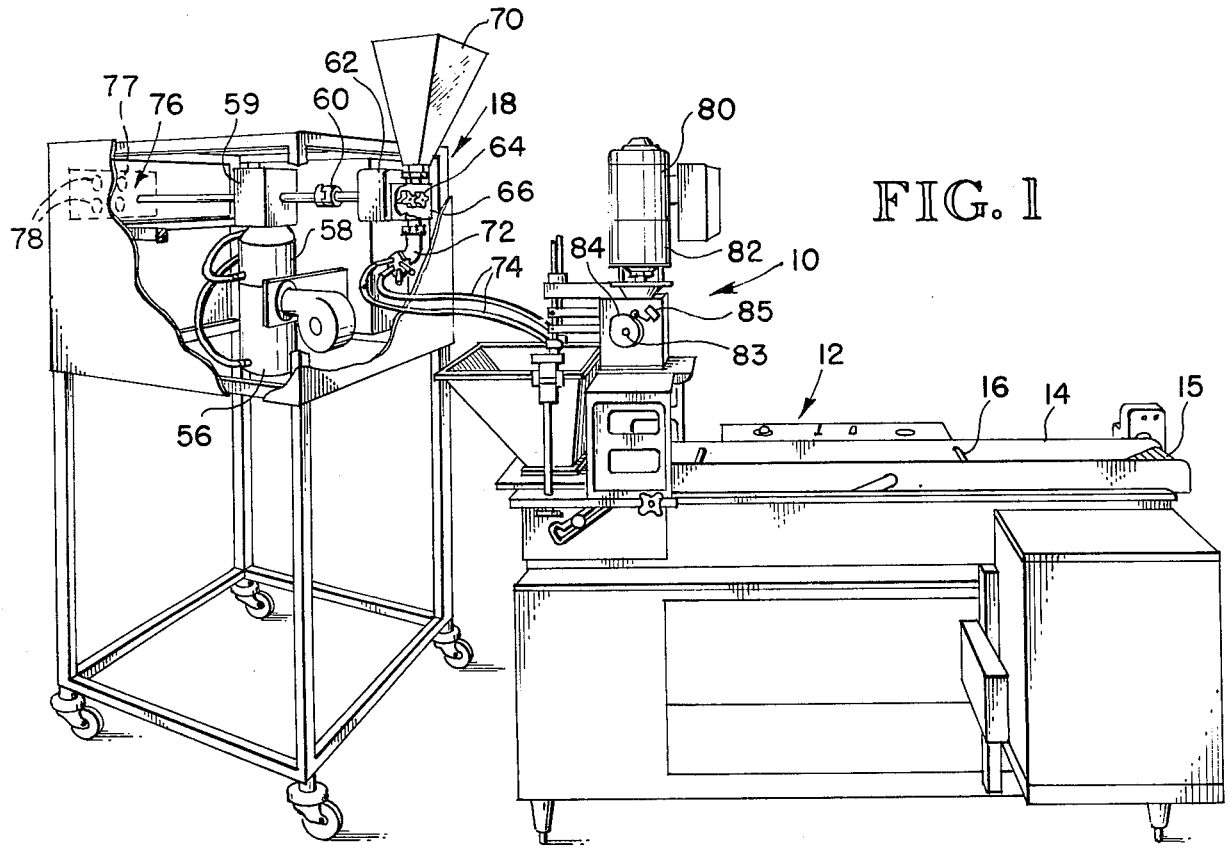
FIG. 1
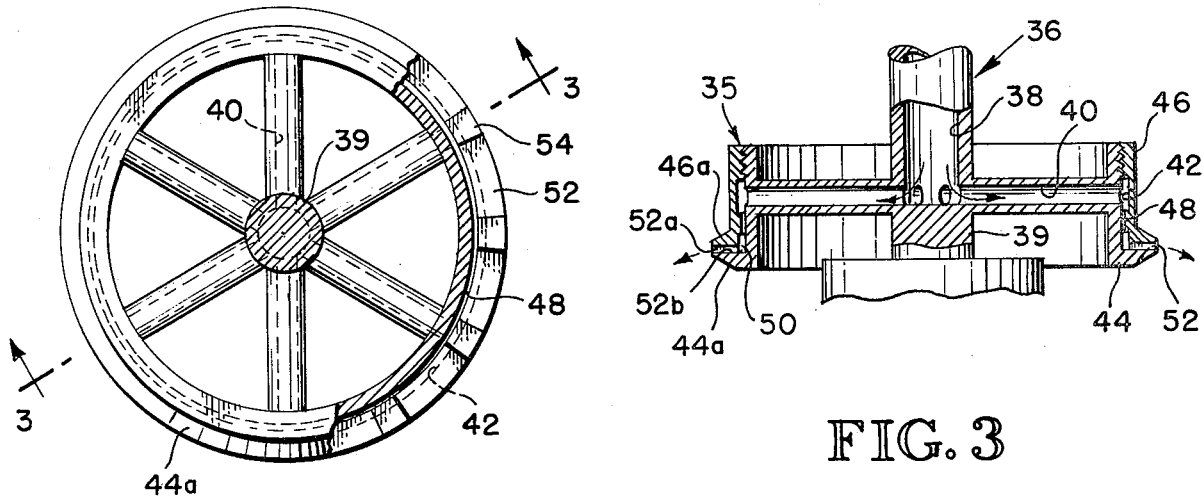

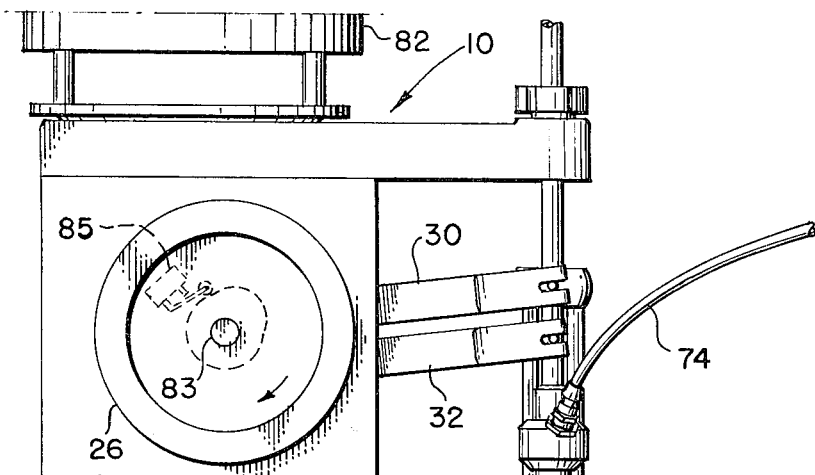
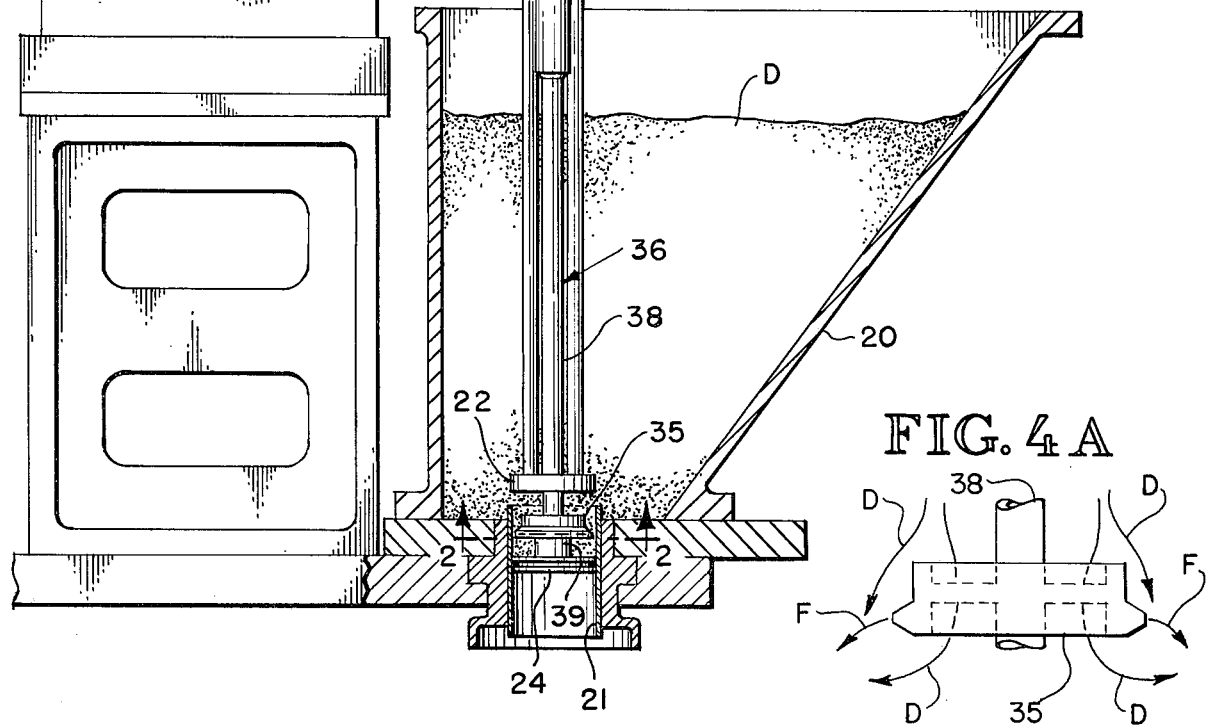
FIG. 4
FIG. 4A
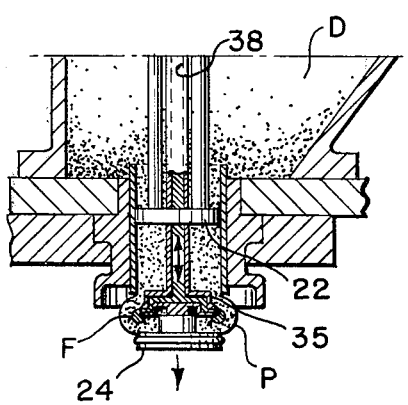
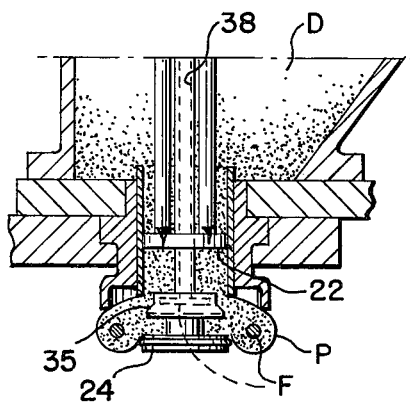
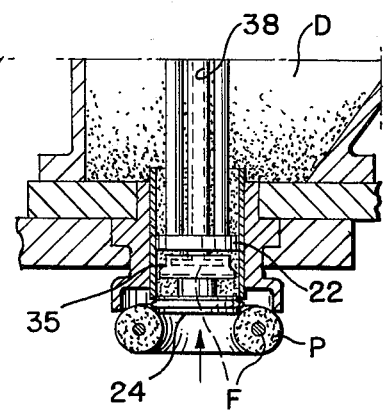
FIG. 5   FIG. 6   FIG. 7

APPARATUS FOR FILLING EDIBLE PRODUCTS

BACKGROUND OF THE INVENTION

1. Field of the Invention

This invention pertains to improvements in methods and apparatus for the production of filled, edible products, such as doughnuts, particularly products of a hollow-center, ring-like configuration but which can also be of other shapes.

2. Description of the Prior Art

Various types of techniques have been used for injecting into doughnuts a filling material, such as cream or jelly. These devices primarily use some form of extrusion technique for forming the product, then either extrude or inject the filling material into the product while in a yet unformed state and then finally form the product around the filling material. These various techniques have generally involved very elaborate mechanical mechanisms to control and guide the flow of both the filling material and the product material and thus have been expensive to manufacture and difficult to maintain.

One problem in injecting the filling material into edible products that are later cooked, as in a fryer, is that the filling material, during the injecting process, is not adequately sealed from the outside surface of the product, preventing the formation of a good bond between the product material at the surface of the product and impairing the quality and appearance of the final product.

Various techniques known to Applicant for filling doughnutlike products are described in the following U.S. Pat. Nos. 3,452,687; 3,362,355; 3,196,810; 2,982,231; 1,933,557.

SUMMARY OF THE INVENTION

It is an object of this invention to provide an improved method for forming hollow, ring-like, edible products with a center ring of filling.

It is another object of this invention to provide an improved process for making filled, toroidal-type doughnuts.

It is another object of this invention to provide a method for making toroidal-shaped, filled doughnuts of a high quality and a good appearance.

It is another object of this invention to provide a method of forming toroidal-shaped, filled doughnuts in which the filling material is placed generally along a line equidistantly located in the doughnut ring.

It is still another object of this invention to provide a method for injecting a filling material into a toroidal-shaped doughnut without leaving a dribble of filling material from within the doughnut to the outside surface of the doughnut.

Basically, these objects are obtained by extruding the doughnut product material along two annular paths that later join together but form a void at the division of the paths. The filling material is then injected generally radially outwardly into the joined paths from within the void. Finally, the product material is closed off between the void and the injected filling material to seal the filling material generally centrally in the cross-section of the product material.

These objects are also obtained by a unique method for controlling the flow of filling material into the product by discharging the filling material through discharge openings or orifices until the desired quantity of filling material has been injected, then generally after a short delay applying negative pressure to draw the filling material back from the discharge orifices and allowing the product material to move over the discharge orifices and form a bond to make the inner surface of the doughnut ring.

It is also an object of this invention to provide an apparatus for making filled, edible products.

It is another object of the invention to provide an apparatus for forming filled, toroidal-shaped, edible products, such as doughnuts.

It is another object of this invention to provide an apparatus for forming toroidal-shaped dougnuts that is generally inexpensive to manufacture, easy to maintain and which provides a high quality product of good appearance and good customer acceptability.

These objects are best obtained by providing means for extruding the doughnut material through and around a filling material discharge nozzle. Means are also provided for forcing filling material out through the discharge nozzle in a generally radially directed ring and then retracting a portion of the filling material back through the discharge nozzle so that the filling material flow is stopped, closing the doughnut material around the filling material between the discharge opening of the filling material discharge nozzle and the ring of filling material in the doughnut and, finally, moving the doughnut and filling material discharge nozzle relative to one another to finally form the filled doughnut.

The invention is applicable to virtually all types of filled, cooked, edible products of various shapes. Preferably, the final product will be a toroidal-shaped, ring-type doughnut with the filling material being placed in a ring centrally in the doughnut. The description hereinafter will refer to a doughnut material and a jelly filling material but this description is solely intended for brevity and explaining one embodiment only.

By extruding the doughnut material through a hollow, jelly discharge nozzle, the doughnut material is able to reform outside of the radially directed discharge openings of the jelly nozzle, such that the injection of the jelly into the reformed ring can be varied radially outwardly or radially inwardly of the formed doughnut ring to position the jelly ring radially within the doughnut. Preferably, the injection is timed to place the ring of jelly in the approximate center of the cross-section of the ring of the doughnut. Further extrusion of the doughnut material after the injection of the jelly is completed draws the remaining doughnut material past the discharge opening of the jelly nozzle to seal the ring of jelly from the inside surface of the doughnut ring. In this way, the jelly does not dribble or have a thread between the two extruded layers of the doughnut, which thread would weaken the structure of the doughnut. The use of positive and negative pressure from within the jelly nozzle to control the discharge of the jelly is highly advantageous since it reduces the number of mechanisms necessary to control the flow of jelly and provides a more positive and clean shutoff of the jelly than has heretofore been possible. The reduction in the number of parts also makes cleaning of the apparatus much less time-consuming.

BRIEF DESCRIPTION OF THE DRAWINGS

FIG. 1 is an isometric illustration of a center-filled doughnut making machine embodying the principles of the invention.

FIG. 1A is a preferred time sequence diagram for one embodiment and one formulation of jelly and doughnut material.

FIG. 2 is a horizontal section taken along the line 2—2 of FIG. 4.

FIG. 3 is a vertical section taken along the line 3—3 of FIG. 2.

FIG. 4 is vertical longitudinal section of a portion of the apparatus shown in FIG. 1 and illustrating one step of a filled doughnut-forming sequence.

FIG. 4A is a schematic illustration of the dough and fill material paths.

FIGS. 5–7 are operational sequence views illustrating further steps in the sequence of making a filled doughnut.

DETAILED DESCRIPTION OF THE PREFERRED EMBODIMENTS

As is best shown in FIG. 1, the filled doughnut making apparatus includes a unique cutter head 10 embodying the principles of the invention which is carried on a well-known doughnut fryer 12. The fryer employs a tank 14 which holds hot cooking oil through which the doughnuts are carried by a conveyor 15. A paddle 16 overturns the doughnuts as they travel through the tank in a well-known manner. Further details of the frying unit are not believed necessary to an understanding of the invention.

Sitting adjacent the frying unit is a filling material dispenser 18 which, as will be described herein below, operates in conjunction with the cutter head 10 to inject semi-solid filling material, such as jelly, in the form of a circle concentric about the center of the doughnut hole and generally centrally positioned in the doughnut ring.

As is best shown in FIGS. 1 and 4, the cutter head includes a conventional hopper 20 for holding a supply of doughnut, pastry or other like edible product D. Seated in the bottom of the hopper is a forming cylinder 21 through which the doughnut material D is extruded. The doughnut material is pushed through the sleeve by a metering piston 22. A forming piston 24 is positioned axially a variable-spaced distance below the metering piston to provide a forming surface for the bottom of the doughnut and to also act as a cutter to sever the doughnut from the forming cylinder, allowing it to fall into the tank 14. As thus far described, the cutter head 10 is similar to known doughnut formers, such as illustrated in U.S. Pat. No. 2,643,621. The pistons 22 and 24 are reciprocated in timed sequence relative to one another by cams 26. The cams are driven through a combination motor-brake and oscillate cam levers 30 and 32 to reciprocate the metering piston 22 and forming piston 24, respectively.

It is a unique feature of this invention that jelly or other fill material can be injected into the product P during the extruding process to form a circular ring of jelly or fill material F approximately in the center of the ring of the doughnut. For this purpose, the forming piston 24 is secured to an actuating rod 36, the intermediate portion of which is a hollow tube 38. The bottom of the tube 38 is solid, as at 39, to form a plug for the end of the hollow tube. As best shown in FIGS. 2 and 3, the hollow tube 38 terminates in a nozzle 35 having a plurality of radially directed tubes 40, preferably six in number, that provide passages for fill material from the tube to a metering cavity 42. The metering cavity 42 is formed between a spoked wheel or disc 44 and a ring 46. The ring 46 is provided with a circumferential band 48 that provides an annular orifice 50, approximately 0.020 of an inch, between the metering cavity 42 and discharge ports 52. The discharge ports 52, approximately 0.025 of an inch in height, are circumferentially spaced about the wheel 44 by a plurality of small bosses 54 machined into the underside of the ring 46. As is readily apparent, the fill material is moved past the band 48 and out through the discharge ports 52 in a discontinuous circular pattern.

As best shown in FIG. 4A, dough D is free to pass between the radial tubes 40 and thus beneath the wheel 44 as well as outwardly of the ring 46 between the ring and the forming cylinder 21. In this manner, the doughnut material is extruded against the forming piston and around the upper and lower surfaces of the discharge ports 52. The discharge ports 52 are formed of upper and lower horizontal surfaces 52a and 52b which enable the jelly to assume a preferred horizontal direction during discharge. Chamfered surfaces 46a and 44a allow the doughnut material to slide smoothly past the discharge passages so that the fill material does not leak out of its desired path.

Movement of the fill material through the discharge ports 52 is uniquely controlled by sequential application of positive and negative pressure to the tube 38. For this purpose, the fill material dispenser 18 is provided with a conventional three-phase motor 56 and a brake 58 to drive a gear reducer 59. The gear reducer is provided with an output shaft 60 that drives a twin-output gear box 62. The outputs of the gear box 62 are coupled to a pair of impellers 64 of a metering pump 66. The pump is of a conventional type providing a positive displacement of fill material from a hopper 70 to the jelly discharge nozzle 35 in exactly measured amounts. The quantity of pumped jelly is determined from a control panel 76 having a meter readout dial 77 coupled to the shaft 60 and a plurality of variable electrical controls 78 for energizing the motor 56 and brake 58 and synchronizing the energization with movement of the doughnut-forming elements of the cutter head 10. The control panel is provided with various time delay relays which, through related circuitry, run the pump 64 to force jelly through a pair of lines 74 to the tube 38, thence through the discharge ports 52. After a predetermined amount of jelly is discharged from the ports 52, the control automatically applies a delay period and then reverses the pump 66 to place a negative pressure on the fill material in the lines 74 to withdraw the fill material from the discharge ports 52 back into the metering cavity 42. In this manner, the flow of fill material into the formed product is completely terminated. A particularly advantageous feature of this type of fill material cut-off is that the area adjacent the discharge ports 52 is kept clean of fill material and the dough can form together tightly adjacent the discharge ports so that no trails or dribbles of fill material are left between the center ring of the fill material and the inner annulus of the doughnut. The controls are variable so that either the quantity of fill material injected can be varied or the length of time of negative pressure varied, depending upon the type of product being formed and the viscosity and like characteristics of the fill material.

In order to provide sufficient delay to allow the fill material to be injected into the product, the cutter head 10 is provided with a motor 80 having a brake 82. The motor drives the cams 26 through a shaft 83. Synchronization of the dispensing apparatus and the cutter head is obtained through a cam 84 keyed to the shaft 83 and operable to close a microswitch 85 when the metering and forming pistons 22 and 24 have reached desired positions in the cylinder 21. This operation is best illustrated in FIGS. 4–7. In FIG. 4, the motor 80 is energized, lowering the forming piston 24 and the metering piston 22 simultaneously, trapping a measured quantity of dough D in the forming cylinder 21. As is conventional practice, the forming piston moves relative to the metering piston into the position shown in FIG. 5, allowing a quantity of the dough D to be extruded between the lower edge of the forming cylinder and the upper surface of the forming piston. At this time, the microswitch 85 is closed to apply the brake 82 and hold the metering and forming pistons in a holding cycle. The switch 85 also signals to the control panel 76, and the motor 56 is energized to force a quantity of jelly through the discharge passages 52. The jelly travels radially outwardly and at a slight angle downwardly, discharging circumferentially spaced, circular segments of jelly into the approximate center of the outer ring of the doughnut. Next, the control energizes the brake 58 and then, after a time delay, reverses the motor 56 to apply a negative pressure to stop the flow of fill material out of the discharge ports 52. The time delay between pushing the jelly out and then applying a negative pressure to shut off the flow of jelly is used to allow the forward motion of the jelly, due to entrapped compressed air, to come to an approximate halt. The signal is then given to again cycle the motor 80 and release the brake 82 to continue downward movement of the metering piston 22, as shown in FIG. 6. The completion of the cycle is, as in conventional equipment, to extrude the doughnut completely and then retract the forming piston to cut off the doughnut and let it fall by gravity into the tank 14. The above cycle is repeated for making a plurality of filled doughnuts.

While the pump 66 is connected to the fill nozzle 35 by a pair of lines 74, more or less lines can be used as desired. Also, an additional line or lines can be coupled between the pump and the fill nozzle of a second cutter unit if desired.

A preferred sequence of operations is best understood from a description of the operational diagram of FIG. 1A. As pistons 24 and 35 are moved down, switch 85 gets closed at time 0 thus; stopping motor 80, applying brake 82 and starting pump 66 in the forward direction. After approximately 1.2 seconds, pump 66 is stopped and the hold-time period begins to allow the jelly flow to stop. After approximately 0.4–0.5 seconds, the pump is started in the reverse direction and runs for approximately 0.6–0.7 seconds. After stopping the pump, the motor 88 is again energized and brake 82 released, completing the cycle of the doughnut formation.

By varying the point of energization of the positive pressure and/or the negative pressure application relative to the product material-extruding operation, the radial location of the ring of jelly within the doughnut ring can be varied outwardly or inwardly as desired. Furthermore, by varying the length of time positive pressure is applied, the quantity of jelly injected can also be varied.

While the preferred embodiments of the invention have been illustrated and described, it should be understood that variations will be apparent to one skilled in the art without departing from the principles expressed herein. Accordingly, the invention is not to be limited to the embodiment illustrated.

The embodiments of the invention in which a particular property or privilege is claimed are defined as follows:

1. Apparatus for filling edible products with a filling material, comprising:
    a product material hopper having a forming cylinder,
    forming piston means reciprocably mounted in said forming cylinder,
    metering piston means axially spaced from said forming piston means and independently reciprocably mounted in said forming cylinder,
    means for reciprocating the forming and metering piston means in said forming cylinder to trap a quantity of product material and extrude it radially outwardly of said forming cylinder in an annular ring, and
    means within said forming cylinder for injecting a ring of filling material substantially radially outwardly into said ring of product material, said injecting means including annular nozzle means providing split product material flow passages over and through said nozzle means whereby the filling material is injected into the space between said split paths.

2. Apparatus of claim 1, said filling material injecting means including a filling material supply, tube means joining said supply with said annular nozzle means, and pump means for applying positive and negative pressures on said filling material to control movement of the filling material through said nozzle means.

3. Apparatus for filling edible products with a relatively low-viscosity, readily flowable filling material, comprising:
    means for partially forming th product into its final form in an atmosphere of a first pressure,
    nozzle means having a discharge orifice for injecting filling material into said partially formed product,
    means applying a positive pressure and a negative pressure less than said first pressure on said filling material for respectively injecting filling material against said product material and for withdrawing a portion of the filling material into said nozzle means and pulling a portion of the product material against said nozzle means discharge orifice for sealing the orifice against filling material leakage, and
    means for finally forming the product between said nozzle and said injected filling material to form a final product completely sealing said filling material.

4. The apparatus of claim 3, said discharge orifice of said filling material nozzle having a fixed opening.

5. The apparatus of claim 3, said means for applying a negative pressure on said filling material including means for varying the negative pressure.

6. The apparatus of claim 3, said means for applying positive and negative pressure on said filling material including means for delaying the application of positive pressure for allowing the low-viscosity filling material to stand stationary inward of said orifice while additional product material is being extruded.

7. The apparatus of claim 3, said nozzle means including an annular cavity, and a metering band separating said cavity from said orifice for providing a smaller surface area opening than said annular cavity to control flow of the filling material to said orifice.

8. Apparatus for filling edible products with a relatively low-viscosity, readily flowable filling material, comprising:
cylinder means, forming means cooperating with said cylinder means for providing a generally radially opening product material discharge passage for partially extruding the product into its final form in an atmosphere of a first pressure,
nozzle means for injecting filling material radially into said partially formed product, said nozzle means including at least one orifice confronting said product material discharge passage,
means applying positive pressure on said filling material in said nozzle means for forcing filling material against said product material and applying negative pressure below said first pressure on said filling material to partially retract the flow of filling material and a portion of said product material against the orifice, and
means for finally forming the product between said nozzle means and the injected filling material to form a final product completely enclosing the filling material.

9. Apparatus of claim 18, said pressure applying means including a filling material supply, a reversible metering pump coupled to said supply, tube means coupling said pump with said nozzle means, and means for operating said pump in a predetermined sequence for injecting, delaying and reversing the flow of filling material between the supply and the nozzle means.

10. Apparatus of claim 8, said nozzle means including a central opening and a smooth outer surface and being positioned between said cylinder means and said forming means whereby product material passes through said central opening and over said outer surface in a split path and is joined again radially outward of said nozzle means, said orifice having a circumferential discharge opening substantially circumferentially of said cylinder and terminating within said split path for injecting the filling material against the rejoined product material, and including means for extruding part of the product along said split path prior to injecting the filling material and for extruding the remaining product material over the orifice circumferential discharge opening to form an annular inner surface of the product between the injected filling material and the orifice circumferential discharge opening.

11. Apparatus of claim 8, said means for applying positive pressure including means for varying the length of time of said positive pressure application to vary the amount of filling material injected.

12. Apparatus of claim 8, including control means for varying the time of initiating energization of said positive pressure for varying the location of the filling material within said product.

13. Apparatus for filling edible products with a filling material, comprising:
a product material hopper having a forming cylinder,
forming piston means reciprocably mounted in said forming cylinder,
metering piston means axially spaced from said forming piston means and independently reciprocably mounted in said forming cylinder,
means for reciprocating the forming and metering piston means in said forming cylinder to trap a quantity of product material and extrude it radially outwardly of said forming cylinder in an annular ring, and
means within said forming cylinder for injecting a ring of filling material substantially radially outwardly into said ring of product material, aid injecting means including annular nozzle means providing split product material flow passages over and through said nozzle means whereby the filling material is injected into the space between said split paths, said filling material injecting means including a filling material supply, tube means joining said supply with said annular nozzle means, and pump means for applying positive and negative pressures on said filling material to control movement of the filling material through said nozzle means, said nozzle means including circumferential discharge means, a plurality of spaced pipes joining said tube means and said discharge means, said spaced pipes allowing passage of said product material therebetween, said nozzle means being spaced between said forming piston and metering piston so that product material is guided past said discharge means from two directions to close off the discharge means during final forming of the product.

14. Apparatus of claim 13, said discharge means including circumferentially spaced ports and an annular, chamfered surface on either side of said ports to guide the product material past said ports.

15. Apparatus for filling edible products with a filling material, comprising:
a product material hopper having a forming cylinder,
forming piston means reciprocably mounted in said forming cylinder,
metering piston means axially spaced from said forming piston means and independently reciprocably mounted in said forming cylinder,
means for reciprocating the forming and metering piston means in said forming cylinder to trap a quantity of product material and extrude it radially outwardly of said forming cylinder in an annular ring, and
means within said forming cylinder for injecting a ring of filling material substantially radially outwardly into said ring of product material, said injecting means including annular nozzle means providing split product material flow passages over and through said nozzle means whereby the filling material is injected into the space between said split paths, said filling material injecting means including a filling material supply, tube means joining said supply with said annular nozzle means, and pump means for applying positive and negative pressures on said filling material to control movement of the filling material through said nozzle means, said nozzle means including an annular cavity and a plurality of circumferentially spaced discharge ports, and a metering band separating said cavity from said discharge ports for providing a smaller surface area orifice than said annular cavity to control flow of the fill material to said discharge ports.

16. Apparatus for filling edible products with a filling material, comprising:
means for partially forming the product into its final form,
nozzle means for injecting filling material into said partially formed product,
means for applying positive pressure on said filling material in said nozzle means and for applying negative pressure on said filling material to partially retract the flow of filling material, and means for finally forming the product between said nozzle means and the injected filling material to form a final product completely enclosing the filling material, said pressure applying means including a filling material supply, a reversible metering pump coupled to said supply, tube means coupling said pump with said nozzle means, and means for operating said pump in a predetermined sequence for injecting, delaying and reversing the flow of filling material between the supply and the nozzle means, said nozzle means including a metering cavity and a plurality of circumferentially, equidistantly spaced discharge ports, and an annular orifice joining said metering cavity and said discharge ports for controlling the flow of filling material to the discharge ports.

17. Apparatus of claim 8, said filling material having a flowable, relatively low viscosity, said means for applying negative pressure on said filling material including means for varying the negative pressure for adjusting for filling materials of various flowable viscosities.

18. Apparatus of claim 8, said filling material having a flowable, relatively low viscosity, said means for applying positive and negative pressure on said filling material including control means for providing a delay between the application of negative pressure to the application of positive pressure for allowing the filling material to stand stationary inward of said orifice while additional product material is being extruded.

19. Apparatus of claim 8, said orifice of said filling material nozzle means having a fixed opening.

20. Apparatus of claim 8, said nozzle means including an annular cavity, and a metering band separating said cavity from said orifice for providing a smaller surface area opening than said annular cavity to control flow of the filling material to said orifice.

21. Apparatus for filling edible products with a relatively low-viscosity, readily flowable filling material, comprising:

cylinder means having a discharge end, forming means including disk means having a peripheral edge in generally coaxial alignment with said cylinder means discharge end for providing with said discharge end a generally radially opening product material discharge passage, means for opening and closing said product material discharge passage for radially extruding a quantity of said product material, and means for moving said quantity of product material through said discharge passage for forming first a partially formed product and then a fully formed product having radially inner and outer portions, injection means for injecting filling material between said discharge end and disk means outwardly against said partially formed product, said injection means including at least one discharge outlet discharging into said product material discharge passage, means applying positive pressure on said filling material in said nozzle means for forcing filling material against said product material while it is in the state of a partially formed product and applying negative pressure sufficient to completely eliminate the positive pressure acting on the filling material so as to halt the flow of filling material out said discharge outlet while said state exists, thereby leaving a predetermined quantity of filling material against said partially formed product, means for coordinating said forming means with said cylinder means to complete the extrusion of said partially formed product into a fully formed product completely enclosing said predetermined quantity of filling material.

* * * * *